Feb. 26, 1963  TAKESHI GOSHIMA  3,078,772
EXPOSURE CONTROLLING MECHANISM FOR PHOTOGRAPHIC CAMERAS
Filed Sept. 21, 1960  2 Sheets-Sheet 1

INVENTOR.
TAKESHI GOSHIMA
BY
ATTORNEY

United States Patent Office 3,078,772
Patented Feb. 26, 1963

3,078,772
EXPOSURE CONTROLLING MECHANISM FOR PHOTOGRAPHIC CAMERAS
Takeshi Goshima, Tokyo, Japan, assignor to Canon Camera Co., Inc., a corporation of Japan
Filed Sept. 21, 1960, Ser. No. 57,544
Claims priority, application Japan Oct. 3, 1959
5 Claims. (Cl. 95—10)

The present invention relates to photographic cameras operatively interlocked with built-in exposure meters, for automatically adjusting the aperture to the proper setting in accordance with the sensitivity of the film being used, the shutter speed and the light condition of the object to be photographed, the exposure mechansim being interlocked with the shutter release means and provided with an indicator of the measured values.

Conventional prior art photographic cameras with built-in exposure meters lacked compactness in the design of their interlocked parts, thus having the disadvantage of complex outward appearance of the camera body, and were furthermore not provided with adequate safety mechanism when the light was either too strong or too weak, that is, was below the lower limit or above the upper limit of the range of the exposure meter, when proper exposure required by the combined values of the film sensitivity and the shutter speed is either below or above the measuring range of the exposure meter. Furthermore, their built-in exposure meters responded inadequately on adjustment of the resistor in their electric circuit or with changes in the area of the photocell window in setting the meter for the film sensitivity and the shutter speed.

An object of the present invention is to provide a photographic camera operatively interlocked with an exposure meter and having a compact, flat-type interlocked mechanism easily built into any miniature camera, so that the proper effective aperture of the lens may be automatically decided upon, dependent on the film sensitivity, the shutter speed and the light condition of the object, and co-operating with the built-in exposure meter in its shutter release operation.

Another object of the present invention is to provide a photographic camera operatively interlocked with an exposure meter in action, the operation of which is highly developed in its automatic as also in its safety, features, including an error-proof device which prevents operation of the shutter release means when the shutter speed is too slow for proper exposure even though the lens aperture is at its minimum under the control of the interlocked exposure meter, or, vice versa, the shutter speed is too fast for proper exposure even though the lens aperture is at its maximum opening under such control of the interlocked exposure meter, and in which the interlocked mechanism does not operate because the light intensity from the object to be photographed is either below or above the measuring range of the exposure meter.

Still another object of the present invention is to provide a photographic camera operatively interlocked with an exposure meter controlling the interlocked diaphragm mechanism and giving the proper aperture to the objective lens corresponding to the film sensitivity and the changed setting of the shutter speed, instead of controlling the window area of the photocell of the exposure meter or the resistor in the electric circuit of the meter when the film sensitivity and the shutter speed setting are changed.

Other objects, advantages and features of the present invention will become more apparent from the following description of an illustrative embodiment in conjunction with the drawing, in which.

Figure 3:
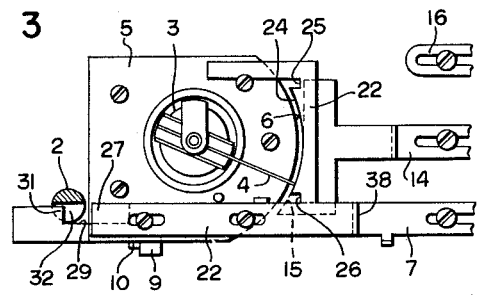
FIGURE 3 is a descriptive plan view of the safety mechanism preventing operation of the shutter release means when proper exposure is not possible even though the objective lens aperture is at its maximum opening because the shutter is improperly set.
Figure 4:
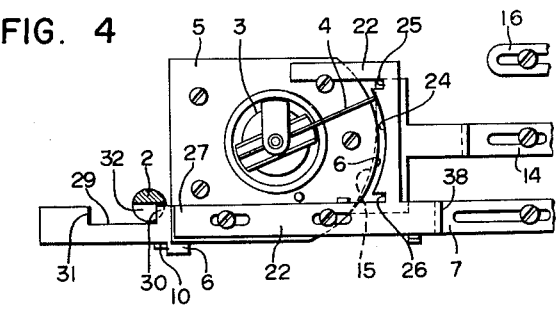
Figure 5:
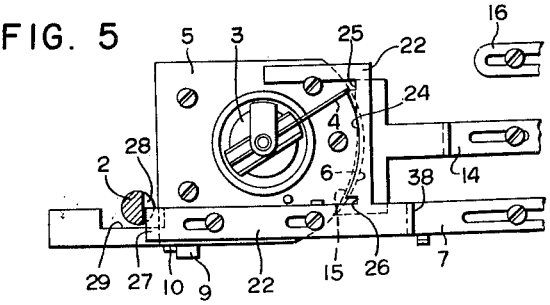

FIGURE 4 is, as compared to FIGURE 3, a descriptive plan view of the safety mechanism preventing operation of the shutter release means, when with the minimum effective aperture of the objective lens the proper exposure is not obtainable; and FIGURE 5 is a descriptive plan view of the safety mechanism preventing operation of the shutter release, when the light intensity of the object to be photographed lies without the measuring range of the exposure meter.

Figure 1:
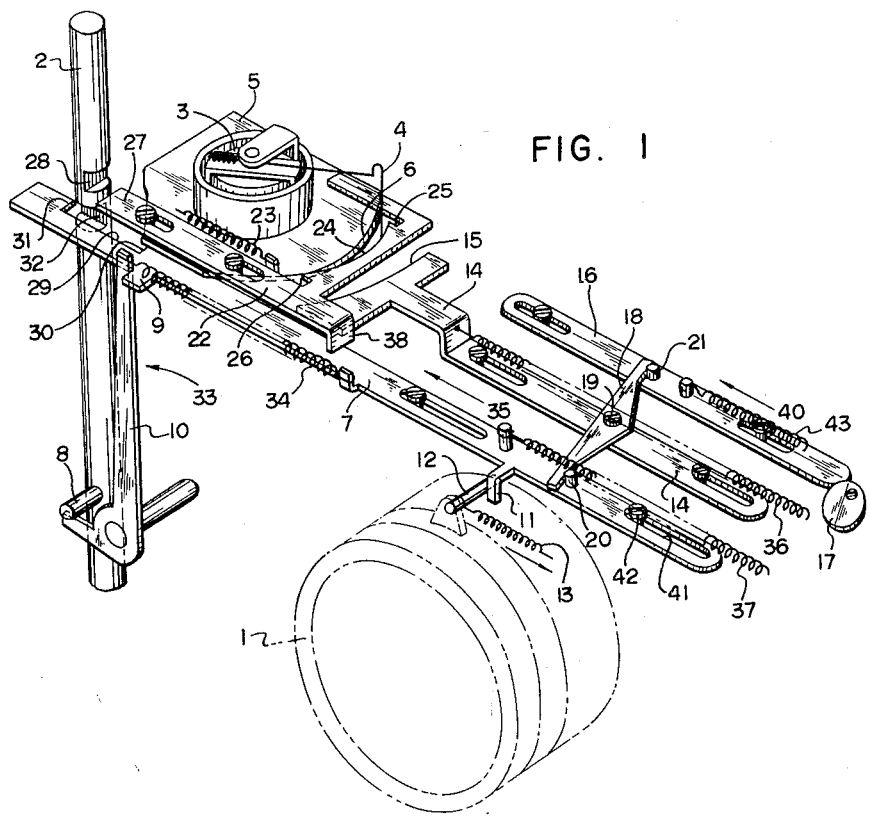
FIGURE 1 is a perspective view of the main portion of the photographic camera operatively interlocked with the exposure meter in accordance with the present invention.
Figure 2:
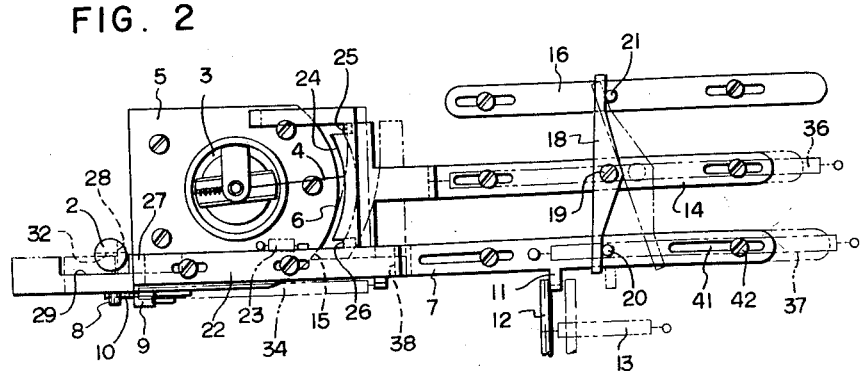
FIGURE 2 is the plan view of said main portion shown in FIG. 1.

FIGURES 1 and 2 show the arrangement and relative relation of the members of the main portion of the interlocked mechanism in accordance with the present invention, and this interlocked mechanism is built into the lower portion of the upper interior of the camera body (not shown in the drawing). This structure comprises an objective lens 1, a release rod 2 for releasing the shutter, a galvanometer 3 of an exposure meter including a galvanometer pointer 4 without, however, a scale plate because observation of a plate is unnecessary, and, instead of a scale plate, a base plate 5 with its front end 6 rounded and coaxial with the driving coil of the pointer immediately behind the pointer in order to clamp the pointer. A main shift member 7, for adjustment of the lens aperture, is interlocked with the release rod 2 through a protrusion 9, a lever 10 pivoted in the camera body, a pin 8 and a spring 34. Shift member 7 has another protrusion 11 which cooperates with a diaphragm lever 12 for adjustment of the effective aperture of lens 1. Diaphragm lever 12 always tends to open the diaphragm under the pull of a spring 13 in the direction of the arrow shown in FIG. 1 below the spring. A cam member 14 moves with shift member 7 to control the forward movement of the shift member and has an arcuate end face 15 to engage the free end of pointer 4. A control lever 16 is actuated in cooperation with and by the shutter speed regulating means and film sensitivity changing device through rotatable cam 17, and a balance lever 18 is pivotally attached to cam member 14 by pin 19, the balance lever engaging with shift member 7 and control lever 16 by means of pins 20 and 21 thereon, respectively, for changing the forward movement of the shift member and the control lever. A clamp plate 22 is shiftable forwardly pulled by a spring 23, a concave front surface 24 thereof being coaxial with the rounded end 6 of base plate 5, the concave surface 24 having a pair of recesses 25 and 26 at both its end regions which prevent clamp plate 22 from being controlled by galvanometer pointer 4 when the pointer is positioned at an extreme point of its angular displacement, that is, when it is out of the measuring range. When pointer 4 is deflected to be positioned at either recess 25 or 26, clamp plate 22 moves forward and end 27 thereof is stopped at a notch 28 of rod 2. Rod 2, in addition, has a notch 32 through which release rod 2 passes and notch 32 engages an edge 30 or 31 of a recess 29 in main shift member 7.

The operation of the interlocked mechanism is as follows: FIGURE 1 shows the mechanism ready for taking pictures, and as described below, control lever 16 having its pin 21 positioned at a predetermined spatial point through cam 17 by the operation of the shutter speed adjusting mechanism or of the film sensitivity indicating mechanism. So, when the exposure meter is turned toward the object and receives light from the photocell window, pointer 4 swings counterclockwise with respect to the light beam from the object. When release rod 2 is pushed down, the interlocked mechanism determining the value of the diaphragm aperture operates before releasing the shutter release means (not shown in the drawing), imparts the required effective aperture value to objective lens 1, and releases the shutter. That is, by the downward motion of release rod 2, lever 10 rotates in the direction of arrow 33, and main shift member 7 shifts forward, in the direction shown by arrow 35, aided by spring 34 and opposed by spring 37. With the forward shift of the main shift member 7, balance-lever 18 also rotates from the broken line showing thereof in FIG. 2 towards its position shown in full lines in such figure, with its cooperating arm in engagement with pin 21 as its fulcrum, and cam member 14 by pin 19 also moves forwardly in the direction of arrow 35 against the tension of spring 36. Since bent portion 38 at the end of clamp plate 22 engages cam member 14, clamp plate 22 which until now has been held back by cam member 14, now likewise shifts forwardly under the tension of spring 23.

When pointer 4 of galvanometer 3 stops at a certain point, as shown in FIGURE 2, in accordance with the light condition of the object at the moment, at first clamp plate 22, of the three shiftable members, main shift member 7, cam member 14 and clamp plate 22, stops moving and simultaneously clamps the pointer between itself and the rounded end 6 of base plate 5. Thereupon cam member 14 engages with clamped pointer 4 so that cam member 14 stops moving whereby pins 19 and 21 are both spatially fixed and shift member 7 is also stopped from further movement. In accordance with this forward movement of shift member 7, protrusion 11 rotates diaphragm lever 12 against the tension of spring 13 and the lens aperture is set at the most proper value obtaining at that time. The foregoing operations are completed in an instant, and then are followed by rod 2, which is continuously moving down, actuating the shutter release mechanism at this time, that is, after shift member 7 has stopped moving and spring 34 is in an elongated condition, and lever 10 is allowed to rotate by the continuing and uninterrupted downward movement of rod 2.

The angular displacement of pointer 4 varies with the light intensity of the object and cam front surface 15, engageable with the pointer, has the shape shown in the drawing, so that when the light intensity is weak and pointer 4 lies near the zero position (recess 26 on the concave front end is to be understood as the zero position in the illustrative embodiment shown in the drawing), the distances through which members 14 and 17 are shifted are short, and the maximum effective aperture of lens 1 requires but little adjustment, and when the light intensity is strong, the distances through which members 14 and 17 are to be shifted are long, so that the maximum effective aperture of lens 1 should require rather considerable adjustment. When release rod 2 is set free, members 14 and 7 are restored to their original positions by return springs 36 and 37, respectively, lever 10 by spring 34, and clamp plate 22 by cam member 14, and the objective lens is also restored to its original, and fully open aperture, by spring 13.

When the shutter speed adjusting mechanism or the film sensitivity indicating mechanism, both of which are omitted from the drawing, are controlled and set at their predetermined values, control member 16 is shifted forward or backward and fixed at a certain definite point by an interlocking member for example cam 17. With the shutter speed, for instance, set higher in value, or the film sensitivity assigned a lower value, control member 16 shifts forward in the direction shown by arrow 40 against the tension of a return spring 43; hence pin 21, where balance lever 18 engages with member 16, moves relatively forward in the direction shown by arrow 35, with the result that the point from which main shift member 7 is shifted, is moved relatively backward. Consequently, in operating the shutter release mechanism, despite the forward movement through the same distance of members 2 and 14, the distance through which member 7 is moved is decreased and the effective aperture of the lens is modified to a lesser extent. Thus by changing the film sensitivity and the shutter speed, the adjustment of the effective aperture of the lens may be completed by operating the related interlocked mechanism without controlling the photocell window area or the electric circuit resistor as usual in the prior art.

When the proper aperture cannot be obtained because the shutter speed is too slow even when the actual aperture is at its minimum, shift member 7 has an excess forward movement and recess 29 of the shift member crosses with rod 2, and, as shown in FIGURE 4, to stop edge 30 at its engaged position in notch 32.

Accordingly, even if rod 2 be pushed down, notch 32 has edge 30 engaged thereinto, and rod 2 cannot be fully depressed to complete the full stroke for releasing the shutter, thereby signalling that at such exposure value taking a picture is impossible with the changed shutter speed. On the other hand, when the shutter speed is too fast, the necessary incident light intensity even though the objective lens is fully open not being obtainable, the shutter release mechanism is not actuatable because edge 31 of recess 29 engages with recess 32 due to the short distance of forward movement of shift member 7, as shown in FIG. 3.

Furthermore, when pointer 4 does not reflect because of the exceedingly weak light intensity from the object (indicator 4 lies in recess 26) or deflects too much because of the excessively strong light intensity from the object (indicator 4 lies in recess 25), when in other words, the light condition of the object lies out of the measuring range of the exposure meter, the shutter mechanism is of such construction that it does not release even when rod 2 is depressed. When the pointer indicator 4 comes to lie, as shown in FIGURE 5, in either recess 25 or recess 26 of clamp plate 22, and the clamp plate moves forwardly a large enough distance that end 27 of the clamp plate engages notch 28 in rod 2.

Accordingly, in other words, when the settings of the three exposure elements are improperly combined, or when the automatic exposure adjustment misses the range because of lack of, or excess in, light intensity, automatic control of the interlocked mechanism renders impossible release of the shutter, preventing incorrect operation and thus advances both safety and automation in this area of cameras with built-in exposure meters.

In the illustrative embodiment of the present invention, the effective aperture of the photographic objective of the camera is always initially at fully open aperture, the aperture opening being decreased by the forward shifting of main shift member 7, but the system may be changed entirely to the contrary, i.e. the effective aperture of the lens may always be opened to its required position only when the shutter is released, and be at its closed minimum position normally. This case may be realized simply by reversing the direction either of the deflection of indicator or pointer 4 or of the curve on cam 15 namely on the front side. As shown in the figures of the drawing, member 7 is provided with elongated, longitudinal slots 41, each with a pin 42 extending thereinto, which serves as shift guides, the cam member 14, the control lever 16 and the clamp plate 22, having similar guiding means.

It will be understood that the present invention is not limited to the materials, figures, etc., and other details described above and illustrated in the drawing, but can be carried out with various modifications without departing from the scope of the invention.

What I claim is:

1. A photographic camera having a shutter release means including a shutter release rod, an exposure meter built into the camera and having a pointer deflectable in accordance with the light intensity from an object to be photographed, a photographic objective with a variable opening diaphragm, means for operating the diaphragm, film sensitivity and shutter speed adjusting means on the camera, and a substantially flat control mechanism for the shutter release means coupled to the release rod and interlockable with the release rod, the pointer and the diaphragm operating means comprising a slidable main shift member, means coupling the slidable main shift member to the release rod, means coupling the main shift member to the diaphragm operating means, a slidable cam member having one end of arcuate shape and engageable with the pointer, a slidable control member positioned by the setting of the film sensitivity and shutter speed adjusting means, the slidable main shift, cam and control members being positioned adjacent to, and shiftable parallel, to each other, and a lever pivoted on the slidable cam member and having one of its arms coupled to the main shift member and its other arm coupled to the control member to move the other two slidable members variable, different but interdependent, predetermined amounts on depression of the shutter release rod during the initial portion of its downward movement.

2. A photographic camera having a shutter release rod, a photographic objective, an exposure meter of a predetermined range built into the camera having a pointer deflectable in accordance with the intensity of light from the object to be photographed incident on the objective, a variable opening diaphragm cooperating with the objective, means for opening and closing the diaphragm, a rotatable cam positionable in accordance with the sensitivity of the film used in the camera and with the shutter speed to be used in taking a photograph, a first elongated longitudinally movable main shift member, means coupling the main shift member to the diaphragm opening and closing means, a first lever actuated by the downward movement of the shutter release rod, a tension spring interconnecting the free arm of the first lever and the main shift member and tending to move the same toward the release rod, a stop integral with the main shift member against which the free end of the first lever normally rests, a base plate supporting the exposure meter and having a formed end, the deflectable pointer extending in the direction of the formed end of the base plate and having a bentover free end portion extending across and spaced from the formed end, a second elongated longitudinally movable member parallel to the first elongated main shift member, a formed end on the second elongated member of a shape supplementing the shape of the base plate formed end and normally spaced therefrom and clamping the bent-over free end portion of the pointer between itself and the formed end of the base plate on engagement therewith, a third elongated longitudinally movable member parallel to the first and second elongated movable members, spring means biasing one end of the third elongated member against the rotatable cam, and a second two-armed lever pivotably supported on the second elongated member of which lever one arm is coupled to the first elongated main shift member and the other arm is coupled to the third elongated control member to move the other two elongated members on depression of the shutter release rod toward the rod during the initial portion of the downward movement of the release rod, the first elongated main shift member being moved a distance insufficient for it to engage the rod and the second elongated member a distance sufficient for it to engage the formed end of the base plate to clamp the deflected pointer therebetween when the pointer is deflected to any position between the minimum and the maximum of the exposure meter range.

3. The photographic camera according to claim 2 in which a clamp plate is slidable longitudinally on the base plate, a formed interior surface of the clamp plate being coaxial with the formed end of the second elongated member and of an arcuate length equal to the arcuate length of the exposure meter range on the base plate formed end, an elongated aperture of sufficient width to receive the bent-over free end of the pointer extending longitudinally at each end of the formed interior surface below the minimum and above the maximum, respectively, of the meter range, the clamp plate having an elongated end toward the release rod and a bent over portion at its other end engaging the adjacent end region of the second elongated movable member, a spring biasing the bent-over portion of the clamp plate against the adjacent end region of the second elongated member, and a slot in the release rod for receiving the elongated end of the clamp plate when the pointer is clamped between the formed end of the base plate and the bottom of one of the elongated apertures of the clamp plate preventing further downward motion of the exposure rod.

4. The photographic camera according to claim 3 in which the first elongated main shift member has an elongated notch at its side adjacent to the exposure rod to enable the first elongated member to clear the rod for all distances moved by the first elongated main shift member to actuate the diaphragm opening and closing means to any of its possible openings of the diaphragm, and a second slot in the release rod for receiving the portion of the first elongated main shift member at either end of the elongated notch when the latter is moved a distance in excess of that required for maximum and minimum diaphragm opening in accordance with the positioning of the third elongated control member by the rotatable cam, thus preventing further downward movement of the release rod.

5. The photographic camera according to claim 2 in which a first return spring having one end anchored in the first elongated main shift member, and a second return spring having one end anchored in the second elongated longitudinally movable member, simultaneously restore the first and second elongated members to their preoperated positions.

References Cited in the file of this patent
UNITED STATES PATENTS

| | | |
|---|---|---|
| 2,418,370 | Simmon | Apr. 1, 1947 |
| 2,868,095 | Gebele | Jan. 13, 1959 |
| 2,913,969 | Faulhaber | Nov. 24, 1959 |
| 2,923,216 | Greger | Feb. 2, 1960 |
| 2,940,046 | Herterich | June 7, 1960 |
| 2,949,070 | Frost | Aug. 16, 1960 |